(12) United States Patent
Lerner

(10) Patent No.: US 7,006,217 B2
(45) Date of Patent: Feb. 28, 2006

(54) COMPACT CATADIOPTRIC IMAGING SPECTROMETER UTILIZING IMMERSED GRATINGS

(75) Inventor: Scott A. Lerner, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 209 days.

(21) Appl. No.: 10/658,141

(22) Filed: Sep. 9, 2003

(65) Prior Publication Data
US 2005/0052647 A1 Mar. 10, 2005

(51) Int. Cl.
G01J 3/28 (2006.01)

(52) U.S. Cl. ...................................... 356/328

(58) Field of Classification Search ............... 356/305, 356/326, 328, 331, 332, 333, 334; 250/339.07
See application file for complete search history.

(56) References Cited

U.S. PATENT DOCUMENTS

| | | |
|---|---|---|
| 5,127,728 A | 7/1992 | Warren et al. |
| 5,717,487 A | 2/1998 | Davies |
| 5,781,290 A | 7/1998 | Bittner et al. |
| 5,880,834 A | 3/1999 | Chrisp |
| 6,016,220 A | 1/2000 | Cook |
| 6,078,048 A | 6/2000 | Stevens et al. |
| 6,100,974 A | 8/2000 | Reininger |
| 6,122,051 A | 9/2000 | Ansley et al. |
| 6,266,140 B1 | 7/2001 | Xiang et al. |
| 6,388,799 B1 | 5/2002 | Arnone et al. |
| 6,538,737 B1 | 3/2003 | Sandstrom et al. |
| 2002/0101587 A1 | 8/2002 | Wilson et al. |
| 2002/0135770 A1 | 9/2002 | Lewis et al. |
| 2003/0016355 A1 | 1/2003 | Koike et al. |

FOREIGN PATENT DOCUMENTS

WO WO 99/63311 12/1999

Primary Examiner—F. L. Evans
(74) Attorney, Agent, or Firm—Eddie E. Scott; Alan H. Thompson

(57) ABSTRACT

An imaging spectrometer comprising an entrance slit for directing light, a lens that receives said light and reflects said light, a grating that defracts said light back onto said lens which focuses said light, and a detector array that receives said focused light. In one embodiment the grating has rulings immersed into a germanium surface.

17 Claims, 5 Drawing Sheets

COMPACT CATADIOPTRIC IMAGING SPECTROMETER UTILIZING IMMERSED GRATINGS

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a spectrometer and more particularly to a compact reflective imaging spectrometer.

2. State of Technology

U.S. Pat. No. 5,717,487 issued Feb. 10, 1998 to Donald W. Davies, and assigned to TRW Inc., provides the following state of technology information, "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter. In past scientific work, the spectral analyses of a host of known elements, molecules, materials, living plants, gases and the like, has been compiled into a library. That library enables objects and things to be identified solely by the spectrometric analysis of the light reflected therefrom. Thus, as example, by examining the spectral content of light reflected from the distant planets, astronomers identified the constituent elements, such as iron, forming those planets; by examining the spectral content of Gases emitted by factory smokestacks, scientists determine if pollutants are being emitted in violation of law or regulation; by examining the spectral content of land, the environmental engineer is able to determine the botanical fertility of a region and its mineral content, and, with subsequent observations, to determine the change in the environment with time; and by examining the spectral content of light reflected in multiple scans over a geographic region, military personnel identify camouflaged military equipment, separate from plant life, in that geographic region. The foregoing represent but a small number of the many known uses of this useful scientific tool."

U.S. patent application Ser. No. 2002/0135770 published Sep. 26, 2002 by E. Neil Lewis and Kenneth S. Haber for a Hybrid Imaging Spectrometer, provides the following state of technology information, "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 issued Jun. 20, 2000 to Charles G. Stevens and Norman L. Thomas for an immersion echelle spectrograph, assigned to The Regents of the University of California, provides the following state of technology information, "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 $cm.sup.-1$. This provides for maximum sensitivity to simple molecules with the narrowest spectral features, allows for corrections for the presence of atmospheric constituents, maximizing species selectivity, and provides greater opportunity to detect unanticipated species. Fourier transform spectrometers, such as Michelson interferometers, have long been the instrument of choice for high resolution spectroscopy in the infrared spectral region. This derives from its advantage in light gathering power and spectral multiplexing over conventional dispersive spectrometers. For remote sensing applications and for those applications in hostile environments, the Fourier transform spectrometer, such as the Michelson interferometer, is ill suited for these applications due to the requirements for keeping a moving mirror aligned to better than a wavelength over the mirror surface. Furthermore, this spectrometer collects amplitude variations over time that are then transformed into frequency information for spectral generation. Consequently, this approach requires stable radiation sources and has difficulty dealing with rapidly changing reflectors or emissions as generally encountered in remote field observations, particularly from moving observation platforms. Furthermore, under conditions where the noise terms are dominated by the light source itself, the sensitivity of the instrument is limited by the so-called multiplex disadvantage."

U.S. Pat. No. 5,880,834 issued Mar. 9, 1999 to Michael Peter Chrisp for a convex diffraction grating imaging spectrometer, assigned to The United States of America as represented by the Administrator of the National Aeronautics and Space Administration, provides the following state of technology information, "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an imaging spectrometer comprising an entrance slit for directing light, a lens that receives said light and directs said light, a grating that receives said light from said lens and defracts said light back onto said lens which focuses said light, and a detector array that receives said focused light. In one embodiment the grating has rulings immersed into a germanium surface. In one embodiment the lens is a catadioptric lens.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
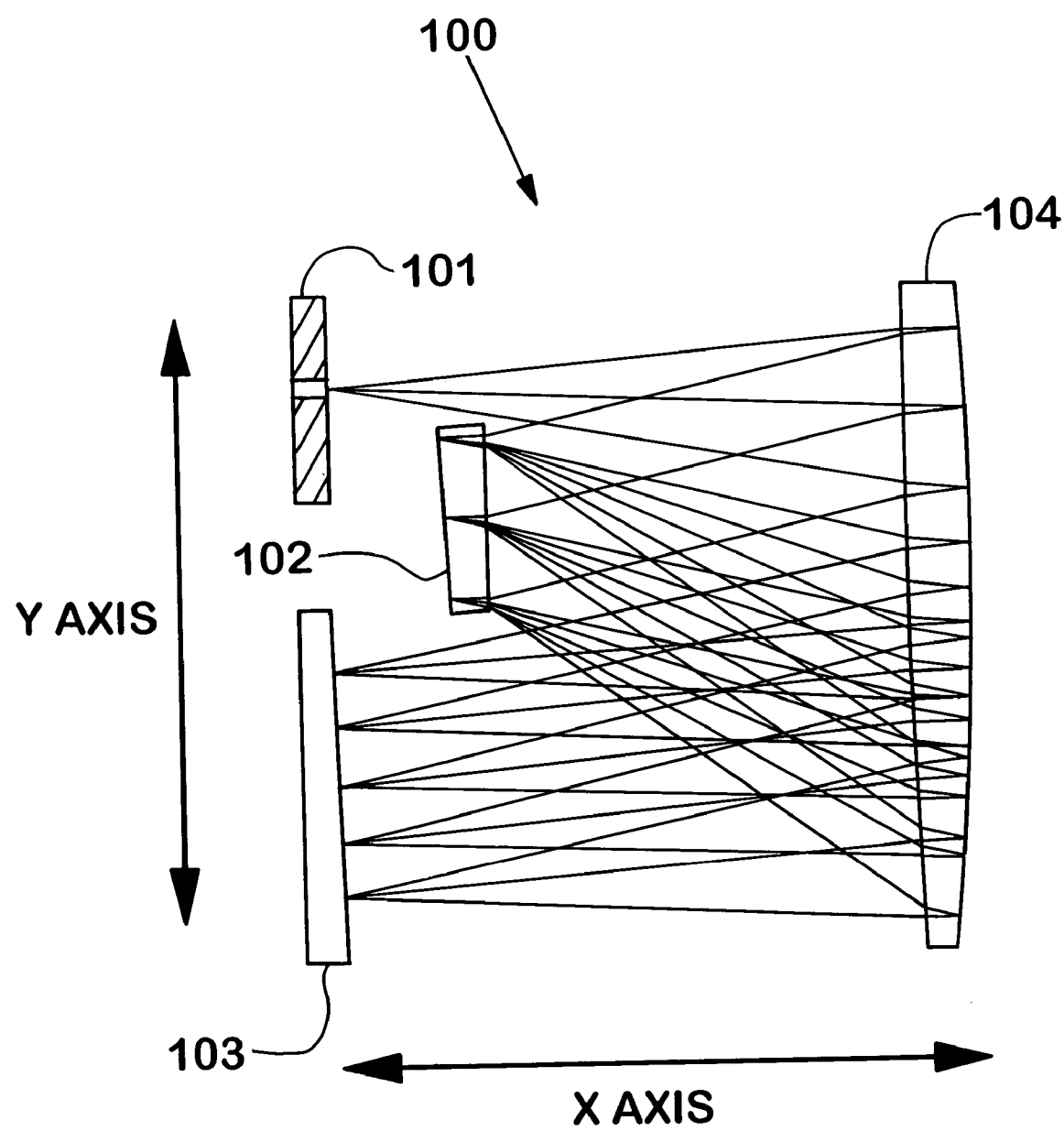
FIG. 1 is a raytrace illustrating an embodiment of a compact imaging spectrometer constructed in accordance with the present invention.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Small size for an imaging spectrometer is extremely important because it determines the requirements for the cryogenic cooling. If the spectrometer is small it can fly in a small UAV. Also, if the spectrometer is small it is person portable. Referring to FIG. 1 of the drawings, an embodiment of a compact imaging spectrometer constructed in accordance with the present invention is illustrated. This embodiment of the present invention is designated generally by the reference numeral 100.

FIG. 1 is a raytrace for the imaging spectrometer 100. The structural elements of the compact imaging spectrometer 100 include an entrance slit 101, a germanium grating 102, an array detector 103, and a ZNSE catadioptric lens 104. A catadioptric lens is a compound lens in which both a mirror(s) and lenses are used to form an image. The imaging spectrometer 100 has a size envelope that is smaller than spectrometers currently in use. The entrance slit 101, the grating 102, the detector array 103, and the ZNSE catadioptric lens 104 fit within the envelope. The envelope is 3.0 cm by 2.7 cm by 1.6 cm or smaller. As shown in FIG. 1 the X axis is 2.7 cm and the Y axis is 3.0 cm.

The imaging spectrometer 100 provides a compact imaging spectrometer based on catadioptric lenses and an immersive diffraction grating. The compact imaging spectrometer 100 is smaller than those currently in use and has a reduced cryogenic cooling requirement enabling its use in small unmanned aerial vehicles and for man portable instruments. The compact imaging spectrometer 100 can be utilized for remote sensing imaging spectrometers where size and weight are of primary importance. The compact imaging spectrometer 100 has very good spectral and spatial registration providing accurate spectral data for spectral algorithm retrievals. This avoids having to resample the images to correct for these defects, which has the disadvantage of creating spectral mixing between pixels reducing the sensitivity and accuracy of the retrieval algorithms.

The compact imaging spectrometer 100 uses smaller cryogenic coolers facilitating their using in portable (man carried) gas detection systems and in small unmanned aerial vehicles for remote gas detection. The compact imaging spectrometer 100 has application for homeland defense to check for the presence of biological or chemical weapons without entering the contaminated areas. The compact imaging spectrometer 100 also has application for the covert remote sensing of sites not accessible to United States forces. The compact imaging spectrometer 100 can be used for commercial remote sensing where portability is important The compact imaging spectrometer 100 has use for pollution detection, and remote sensing of agricultural crops, and geological identification. They could also be used for the remote monitoring of industrial processes.

The compact imaging spectrometer 100 is diffraction limited over the wavelength ranges with excellent spatial and spectral resolutions. The spectral slit curvature has been corrected to less than one tenth of a pixel over the detector arrays. This is the curvature of slit image on the detector at a single wavelength, which is a common problem with imaging spectrometer designs. The spatial mapping distortion has also been corrected to less than one tenth off a pixel over the full wavelength range. This means that the spectrum from a single point in the entrance slit will not wander from the center of a row pixels by less than ±2 microns. Correcting the spectral slit curvature and the spatial mapping distortion with wavelength to less than one tenth of a pixel ensures that the images do not have to be resampled to correct for these effects.

The ZNSE catadioptric lens 104 in the compact imaging spectrometer 100 consist of rotationally symmetric surfaces. In another embodiment anamorphic aspheric surfaces are used. The cold stop in the compact imaging spectrometer 100 is at the germanium grating. This ensures that the warm back radiation from outside the spectrometer entrance slit does not reach the detector array. This would cause and unacceptable degradation in the signal to noise ratio. The geometry of the compact imaging spectrometer 100 allows a transmissive cold stop to be used ahead of the grating, for even better thermal background reduction, but this also increases the grating sizes.

Figure 2:
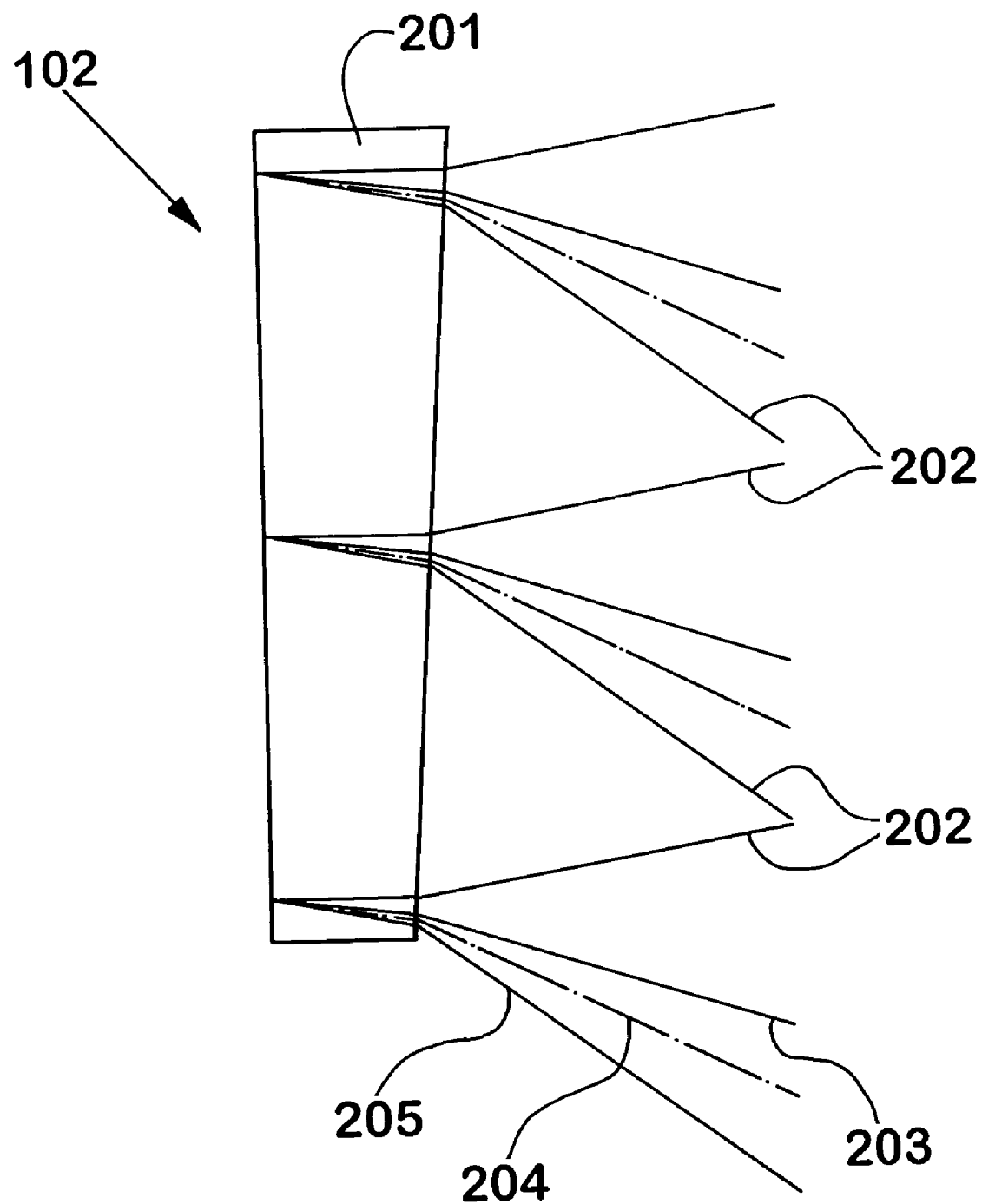
FIG. 2 illustrates the grating shown in FIG. 1.

Referring now to FIG. 2, the grating 102 is illustrated in greater detail. In the compact imaging spectrometer 100 gratings are used with equally spaced straight rulings 201 on a flat surface. The diffraction grating 102 has the rulings immersed into a prism. The grating 102 can be diamond flycut with a blazed profile that will have maximum diffraction efficiency. In the diffraction grating 102, light enters from the front germanium surface (which may have power) and then passes through the germanium to diffraction off the grating rulings 201 at the back surface. The diffracted light then propagates through the prism and out. The grating is cut on the back of a wedged prism. The refractive face of the prism may be spherical or plano. For the compact imaging spectrometer 100, the diffraction grating 102 is on a plano surface.

In FIG. 2, the raytrace shows different stages of the light as the light interacts with the grating 102. The undispersed light before the grating is designated 202. The dispersed light after the grating is designated 203, 204, and 205. The short 8 μm wavelength light is 203. The medium wavelength light is 204. The long wavelength light is 205.

In the compact imaging spectrometer 100, light goes from the entrance slit 101 to the ZNSE catadioptric lens 104 which refracts it to the ruled germanium grating 102. The diffracted order in then propagates back to the ZNSE catadioptric lens 104 which focuses onto the 2D detector array 103. The germanium grating 102 is a wedged prism with curvature on 1 side and with the grating ruled on the flat side. The grating in another embodiment is made into a piano prism with some performance degradation. The compact imaging spectrometer 100 meets the requirements in Table 1 below.

TABLE 1

(Imaging Spectrometer Performance)

| | |
|---|---|
| Spectral Range | 8–13.5 microns |
| F-number | 5 |
| Detector array | 256 spatial × 256 spectral |
| Pixel size | 40 microns |
| Entrance slit length | 10.24 mm |
| Spatial distortion: change in spatial mapping with wavelength | <0.1 pixel (<±2 microns) |
| Spectral distortion: spectral smile | <0.1 pixel (<±2 microns) |
| Optical performance | Diffraction limited |

Figure 3:
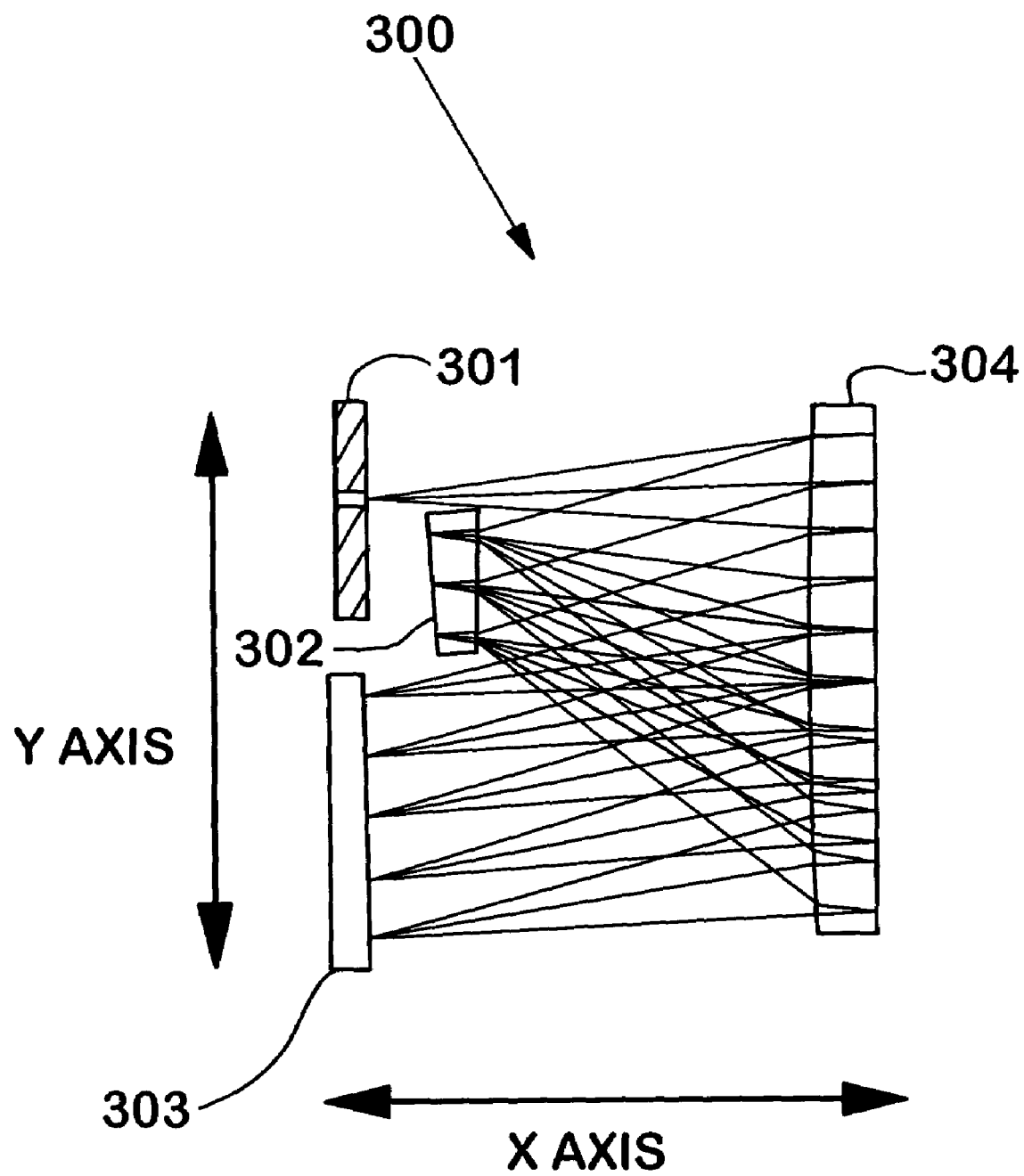
FIG. 3 is a raytrace illustrating another embodiment of a compact imaging spectrometer constructed in accordance with the present invention.

Referring now to FIG. 3 of the drawings, another embodiment of a compact imaging spectrometer constructed in accordance with the present invention is illustrated. This embodiment of the present invention is designated generally by the reference numeral 200. FIG. 3 is a raytrace for the imaging spectrometer 300. The present invention provides a compact imaging spectrometer based on catadioptric lenses and an immersive diffraction grating. The compact imaging spectrometer 300 is smaller than those currently in use and has a reduced cryogenic cooling requirement enabling its use in small unmanned aerial vehicles and for man portable instruments. The structural elements of the compact imaging spectrometer 300 include an entrance slit 301, a germanium grating 302, an array detector 303, and a lens 304. For the compact imaging spectrometer 300, the main difference from the compact imaging spectrometer 100 is that the lens is Germanium.

The diffraction grating 302 has the rulings immersed into a prism. The grating 302 can be diamond flycut with a blazed profile that will have maximum diffraction efficiency. In the diffraction grating 302, light enters from the front germanium surface (which may have power) and then passes through the germanium to diffraction off the grating rulings at the back surface. The diffracted light then propagates through the prism and out. The grating is cut on the back of a wedged prism. The refractive face of the prism may be spherical or plano. For the compact imaging spectrometer 300, the diffraction grating 302 is on a plano surface.

The imaging spectrometer 300 has a size envelope that is smaller than spectrometers currently in use. The entrance slit 301, the grating 302, the detector array 303, and the catadioptric lens 304 fit within the envelope. The envelope is 3.0 cm by 2.7 cm by 1.6 cm or smaller. As shown in FIG. 3 the X axis is 2.7 cm and the Y axis is 3.0 cm. The compact imaging spectrometer 300 meets the requirements in Table 1.

Figure 4:
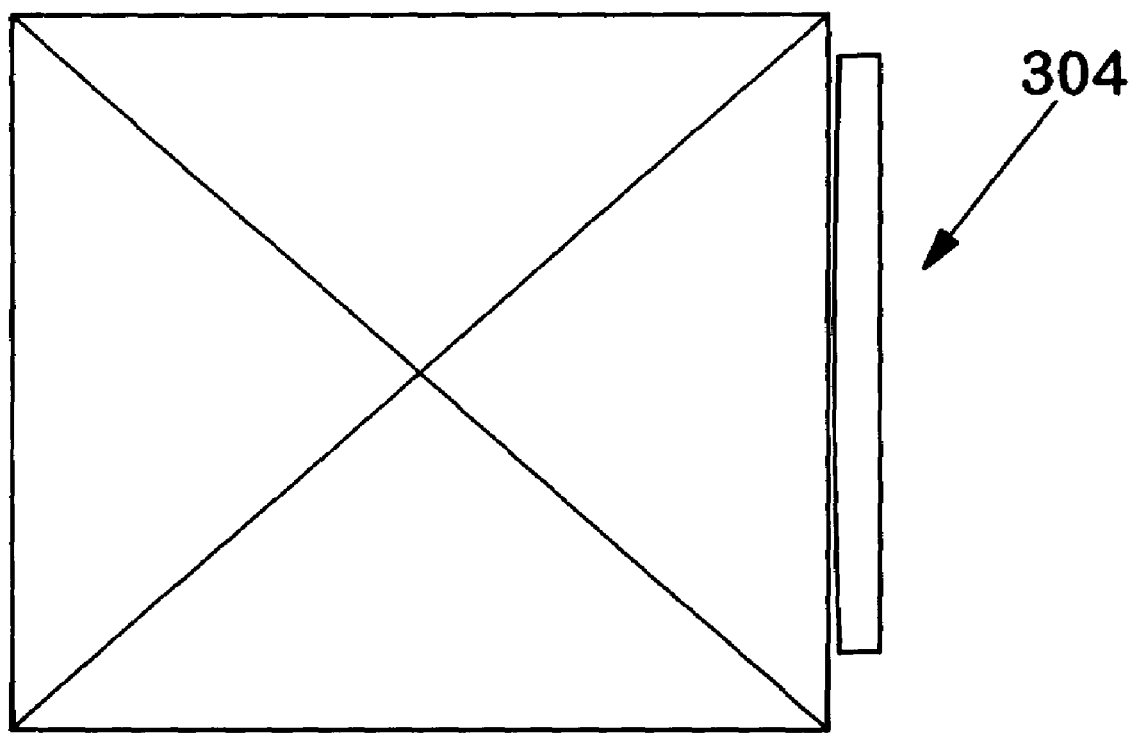
FIG. 4 illustrates the lens shown in FIG. 3.

Referring now to FIG. 4, the lens 304 is illustrated in greater detail. In the compact imaging spectrometer 300, the lens 304 consists of rotationally symmetric surfaces. In the compact imaging spectrometer 300, light goes from the entrance slit 301 to the lens 304 which refracts it to the ruled germanium grating 302. The diffracted order in then propagates back to the lens 304 which focuses onto the 2D detector array 303. The germanium grating 302 is a wedged prism with curvature on one side and with the grating ruled on the flat side. The grating in another embodiment is made into a plano prism with some performance degradation.

The lens 304 is a catadioptric lens and the catadioptric lens surfaces are defined by a standard aspheric surface. The standard aspheric optical surface is defined by a rotationally symmetric explicit equation of the form $-z+F(r)=0$, where $r=\sqrt{x^2+y^2}$. The surface is defined as a conic section plus an even-order polynomial. It is an explicit surface because the surface sagitta (sag) is defined directly as a function of Cartesian coordinates x and y. The surface sag, z, is defined as follows:

$$-z + F(r) = -z + \frac{c \cdot r^2}{1 + \sqrt{1 - (1+k)c^2 \cdot r^2}} + \sum_{i=1}^{t} a_{2i} \cdot r^{2i} = 0$$

where c is the curvature at the vertex of the surface, and k is the conic constant.

Figure 5:
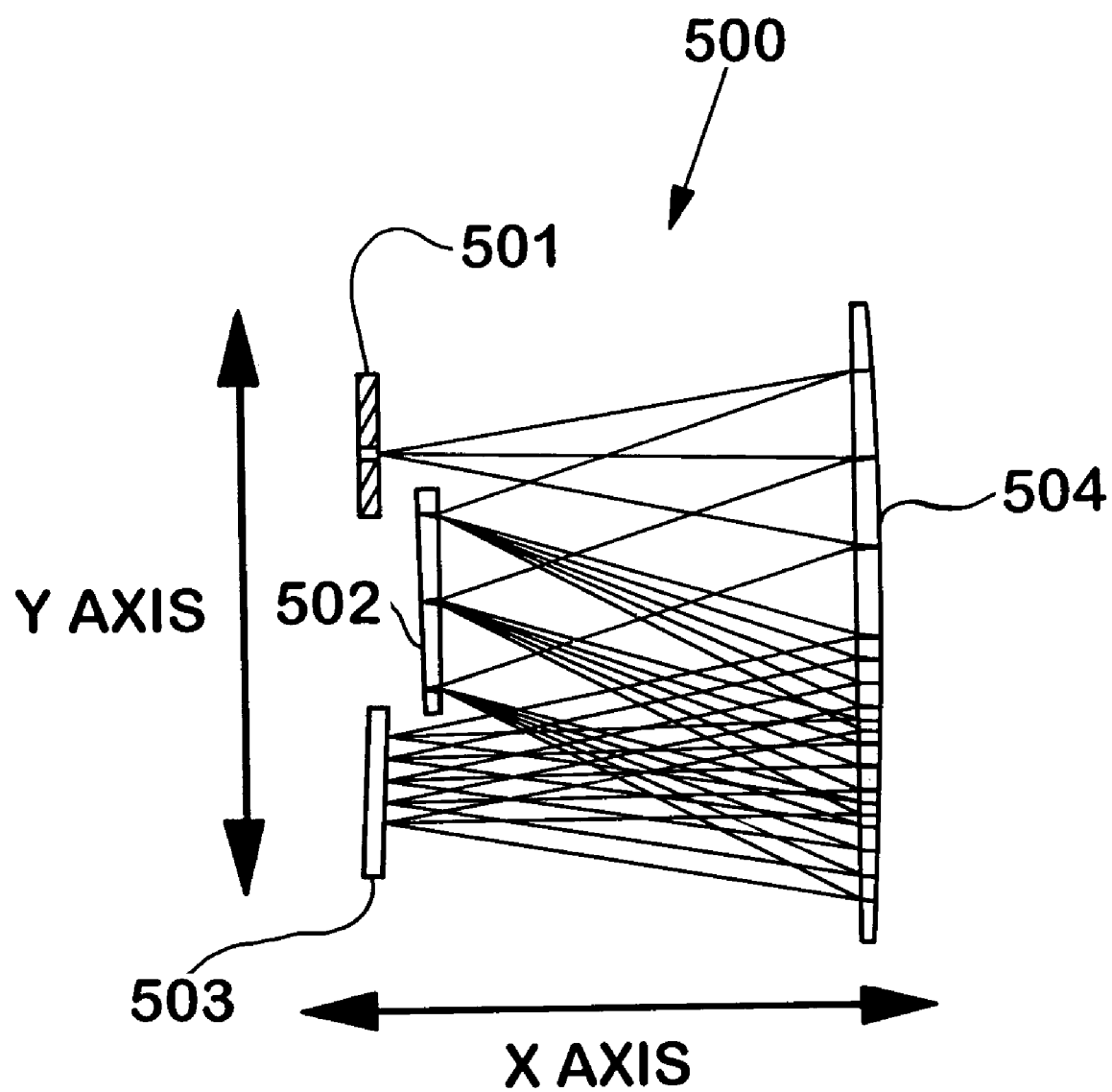
FIG. 5 is a raytrace illustrating another embodiment of a compact imaging spectrometer constructed in accordance with the present invention.

Referring now to FIG. 5 of the drawings, another embodiment of a compact imaging spectrometer constructed in accordance with the present invention is illustrated. This embodiment of the present invention is designated generally by the reference numeral 500. For the compact imaging spectrometer 500, the design is similar to that of FIGS. 1 and 3 and has a relatively high f/# of f/3.

FIG. 5 is a raytrace for the imaging spectrometer 500. The present invention provides a compact imaging spectrometer based on catadioptric lenses and an immersive diffraction grating. The compact imaging spectrometer 500 is smaller than those currently in use and has a reduced cryogenic cooling requirement enabling its use in small unmanned aerial vehicles and for man portable instruments. The structural elements of the compact imaging spectrometer 500 include an entrance slit 501, a germanium grating 502, an array detector 503, and a lens 504.

The diffraction grating 502 has the rulings immersed into a prism. The grating 502 can be diamond flycut with a blazed profile that will have maximum diffraction efficiency. In the diffraction grating 502, light enters from the front germanium surface (which may have power) and then passes through the germanium to diffraction off the grating rulings at the back surface. The diffracted light then propagates through the prism and out. The grating is cut on the back of a wedged prism. The refractive face of the prism may be spherical or piano. For the compact imaging spectrometer 500, the diffraction grating 502 is on a piano surface.

The imaging spectrometer 500 has a size envelope that is smaller than spectrometers currently in use. The entrance slit 501, the grating 502, the detector array 503, and the ZNSE catadioptric lens 504 fit within the envelope. The envelope is 6.0 cm by 6.0 cm by 3.1 cm or smaller. As shown in FIG. 5 the X axis is 6.0 cm and the Y axis is 3.1 cm.

In the compact imaging spectrometer 500, the lens 504 consists of rotationally symmetric surfaces. In the compact imaging spectrometer 500, light goes from the entrance slit 501 to the lens 504 which refracts it to the ruled germanium grating 502. The diffracted order in then propagates back to the lens 504 which focuses onto the 2D detector array 503. The germanium grating 502 is a wedged prism with curvature on 1 side and with the grating ruled on the flat side. The grating in another embodiment is made into a piano prism with some performance degradation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An imaging spectrometer apparatus, comprising:
   an entrance slit for directing light,
   a lens that receives said light and directs said light,
   a grating that receives said light from said lens and defracts said light back onto said lens which focuses said light, and wherein said grating has rulings immersed into a germanium surface, and
   a detector array that receives said focused light.

2. The imaging spectrometer apparatus of claim 1 wherein said grating has rulings immersed into a wedged germanium grating.

3. The imaging spectrometer apparatus of claim 1 wherein said grating has rulings immersed into a flat germanium grating.

4. The imaging spectrometer apparatus of claim 3 wherein said grating has equally spaced straight rulings.

5. The imaging spectrometer apparatus of claim 1 wherein said grating has rulings that have varying ruling spacings.

6. The imaging spectrometer apparatus of claim 1 wherein said grating has rulings that are curved.

7. The imaging spectrometer apparatus of claim 1 wherein said grating has rulings that are cut on the back of a wedged piano-convex lens.

8. The imaging spectrometer apparatus of claim 1 wherein said grating has rulings that are cut on the back of a wedged piano-concave lens.

9. The imaging spectrometer apparatus of claim 1 wherein said grating has rulings that are cut on the back of a wedged germanium prism.

10. The imaging spectrometer apparatus of claim 1 wherein said apparatus has a front and a back, and wherein said entrance slit and said detector array are located at or near said front, and wherein said lens is located at or near said back.

11. The imaging spectrometer apparatus of claim 10 wherein said entrance slit, said grating, said lens, and said detector array fit within an envelope located between said front and said back.

12. The imaging spectrometer apparatus of claim 11 wherein said envelope is 3.0 cm by 3.7 cm by 1.6 cm or smaller.

13. The imaging spectrometer apparatus of claim 11 wherein said envelope is 2.3 cm by 2.2 cm by 1.4 cm or smaller.

14. The compact imaging spectrometer apparatus of claim 11 wherein said envelope is 6.0 cm by 6.0 cm by 3.1 cm or smaller.

15. The imaging spectrometer apparatus of claim 1 wherein said lens is a catadioptric lens.

16. The imaging spectrometer apparatus of claim 1 wherein said lens is a ZNSE catadioptric lens.

17. The imaging spectrometer apparatus of claim 1 wherein said lens has rotationally symmetric surfaces.

* * * * *